(12) United States Patent
Ichikawa

(10) Patent No.: US 9,707,781 B2
(45) Date of Patent: Jul. 18, 2017

(54) PRINTING CONTROL DEVICE, PRINTING DEVICE, PROGRAM, AND RECORDING MEDIUM

(71) Applicant: MIMAKI ENGINEERING CO., LTD., Nagano (JP)

(72) Inventor: Youichi Ichikawa, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 14/916,568

(22) PCT Filed: Sep. 3, 2014

(86) PCT No.: PCT/JP2014/073208
§ 371 (c)(1),
(2) Date: Mar. 4, 2016

(87) PCT Pub. No.: WO2015/033965
PCT Pub. Date: Mar. 12, 2015

(65) Prior Publication Data
US 2016/0214418 A1 Jul. 28, 2016

(30) Foreign Application Priority Data
Sep. 5, 2013 (JP) ................................. 2013-184431

(51) Int. Cl.
*B41J 11/00* (2006.01)
*B41J 19/14* (2006.01)
(Continued)

(52) U.S. Cl.
CPC ......... *B41J 25/006* (2013.01); *B41J 11/0025* (2013.01); *B41J 19/142* (2013.01);
(Continued)

(58) Field of Classification Search
CPC .... B41J 25/006; B41J 11/002; B41J 11/0025; B41J 11/003; B41J 19/142
See application file for complete search history.

(56) References Cited

U.S. PATENT DOCUMENTS

| 6,834,929 B1 | 12/2004 | Adams et al. |
| 2005/0099644 A1 | 5/2005 | Nomoto et al. |
| 2009/0092404 A1* | 4/2009 | Tashiro ................. B41J 11/003 399/38 |

FOREIGN PATENT DOCUMENTS

| EP | 1293349 | 3/2003 |
| JP | 2002-36644 | 2/2002 |
| JP | 2013-159470 | 8/2013 |

OTHER PUBLICATIONS

"International Search Report (Form PCT/ISA/210) of PCT/JP2014/073208", mailed on Dec. 9, 2014, with English translation thereof, pp. 1-4.

(Continued)

*Primary Examiner* — Jason Uhlenhake
(74) *Attorney, Agent, or Firm* — Jianq Chyun IP Office

(57) ABSTRACT

A printing control device, a printing device and a non-transitory computer-readable recording medium are provided. It is possible to set a scan width of a head to a user's desired width. A printing control unit controls a printing device having a head, and includes an input receiving unit for receiving a scan width information representing a width over which the head will move during scanning, and the scan width information is information representing a user's desired numerical value.

8 Claims, 2 Drawing Sheets

(51) Int. Cl.
*B41J 25/00* (2006.01)
*G06F 3/12* (2006.01)
*G06K 15/10* (2006.01)
*G06K 15/02* (2006.01)

(52) U.S. Cl.
CPC .............. *G06F 3/12* (2013.01); *G06K 15/102* (2013.01); *G06K 15/1809* (2013.01)

(56) References Cited

OTHER PUBLICATIONS

"Office Action of Japan Counterpart Application", issued on Sep. 20, 2016, with English translation thereof, pp. 1-7.
"Search Report of European Counterpart Application", issued on Feb. 20, 2017, p. 1-p. 7, in which the listed references were cited.

\* cited by examiner

PRINTING CONTROL DEVICE, PRINTING DEVICE, PROGRAM, AND RECORDING MEDIUM

CROSS-REFERENCE TO RELATED APPLICATION

This application is a 371 of international application of PCT application serial no. PCT/JP2014/073208, filed on Sep. 3, 2014, which claims the priority benefit of Japan application no. JP 2013-184431, filed on Sep. 5, 2013. The entirety of each of the above-mentioned patent applications is hereby incorporated by reference herein and made a part of this specification.

TECHNICAL FIELD

The present invention relates to a printing control device, a printing device, a program, and a recording medium for controlling a scan width of a head.

BACKGROUND ART

In Patent Document 1, there is disclosed an inkjet recording device for reducing the time of recording in a case of making a record of a plurality of images.

PRIOR ART DOCUMENT

Patent Document

Patent Document 1: JP-A-2002-36644 (published on Feb. 6, 2002)

SUMMARY OF THE INVENTION

Problem to be Solved by the Invention

In a printing device which performs printing by scanning a recording medium with a head for ejecting ink, the scan width of the head is set in advance. Examples of the scan width include the maximum width over which the corresponding printing device can perform drawing, the width between both edges of a recording medium, and a width which can be changed whenever scanning is performed once, like the width of an image area to be printed. These widths are recorded in the printing device in advance, and can be appropriately changed.

In a case of setting the scan width of the head to a width for scanning over the width of an image area to be printed, although it is possible to finish printing within a short time, it is apprehended that some types of ink will not sufficiently dry.

Meanwhile, in a case of setting the scan width of the head to the maximum width over which the printing device with the head can perform drawing, it is apprehended that the time of printing will lengthen.

The demands for the degree of dryness of ink when printing finishes and the time required to perform printing differ from user to user. Also, depending on the types of ink, media, and the like which a user uses, the rate of drying of ink differs, and thus the scan width of the head necessary to achieve a desired degree of dryness and a desired printing time differ.

The present invention was made in view of that circumstances, and an object of the present invention is to make it possible to set a scan width of a head to a user's desired width.

Solutions to the Problem

In order to achieve the above described object, a printing control device according to the present invention is a printing control device for controlling a printing device having a head for scanning a recording medium and ejecting ink onto the recording medium, and is characterized in that the printing control device includes: a scan width information receiver that receives a scan width information representing a width over which the head will move during scanning, and the scan width information is information representing a user's desired numerical value.

A user can perform scanning with the head over a desired width. Therefore, it is possible to adjust the degree of drying of ink and the length of printing time as desired.

In the printing control device according to the present invention, it is preferable that the scan width information should be information representing a length of the width over which the head will move, or information representing a time required for the head to move by the width.

Since the user can easily assume an actual scan width, inputting becomes easy.

It is more preferable that the printing control device according to the present invention should include: a head scan controller that determines a width over which the head will perform scanning, and in a case where the width represented by the scan width information received by the scan width information receiver is larger than a predetermined specific width, the head scan controller should determine the specific width as the width over which the head will perform scanning.

As an example of the specific width, the maximum width settable as the scan width can be taken. For example, the maximum width is a width for perform scanning over the maximum drawing width over which the printing device can perform printing. Even if the scan width information receiver receives a width larger than the maximum width, the head cannot perform scanning over the corresponding width. For this reason, the scan width of the head is corrected to the maximum width, whereby it is possible to appropriately set the scan width of the head.

It is more preferable that the scan width information receiver should receive an instruction for switching between a mode for receiving a desired numerical value from a user and a mode for receiving selection of a preset scan width candidate.

The user can easily set a scan width. For example, in a case where the user wants to finish printing most quickly without a demand for the degree of drying of ink, the user needs only to select the shortest one of preset scan width candidates, and does not need to input a numerical value. Meanwhile, in a case where the user wants to perform sufficient drying without a demand for the printing speed, the user needs only to select the longest one of the preset scan width candidates.

Also, a printing device according to the present invention is characterized in that the printing device includes: a head that scans a recording medium and ejects ink onto the recording medium, and a printing control device that controls scanning of the head, and the printing control device includes: a scan width information receiver that receives a scan width information representing a width over which the head will move during scanning, and the scan width information is information representing a user's desired numerical value.

Also, the printing control device according to each aspect of the present invention may be implemented by a computer, and in this case, a non-transitory computer-readable recording medium retaining a program for making a computer function as: a head scan controller which performs control such that a head scans a recording medium and ejects ink onto the recording medium; and a scan width information receiver which receives information representing a user's desired numerical value as a scan width information representing a width over which the head will move during scanning.

Effects of the Invention

According to the present invention, an effect that a user can perform scanning over a desired width by a head is obtained.

EMBODIMENTS OF THE INVENTION

<Configuration of Printing Device 1>

Figure 1:
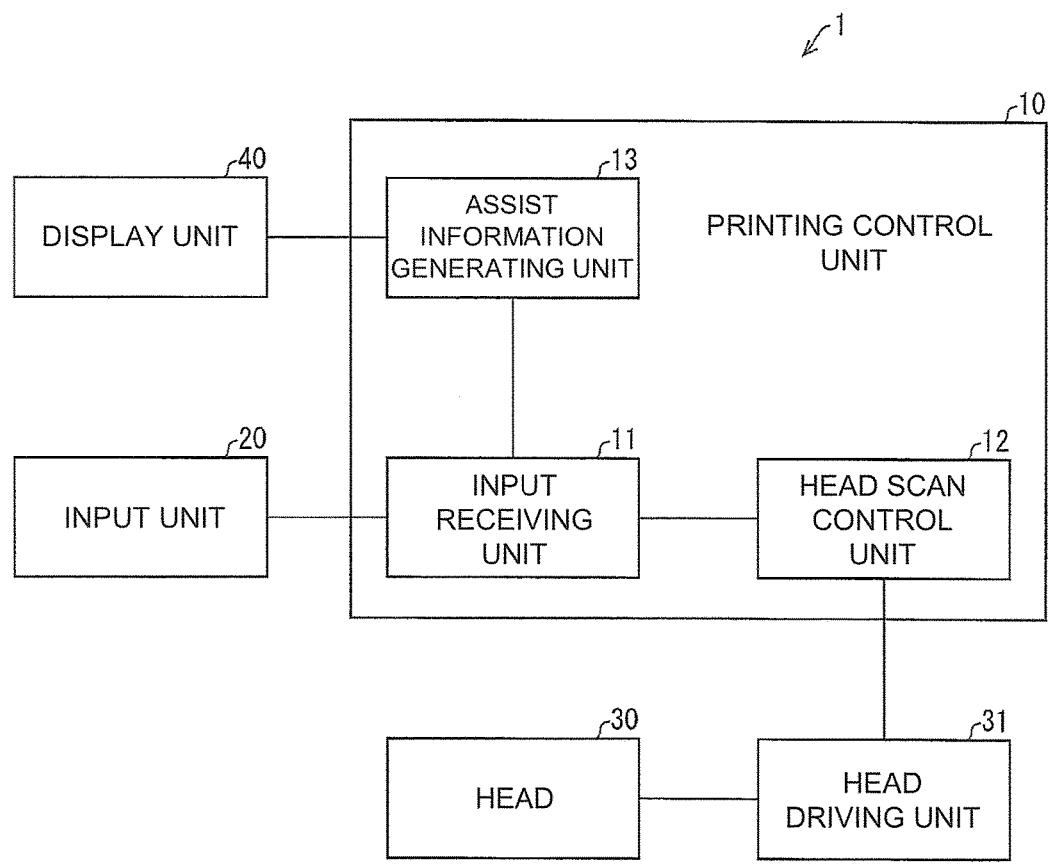
FIG. 1 is a block diagram illustrating the configuration of a printing device 1 according to an embodiment of the present invention.

An embodiment of the present invention will be described. First, the configuration of a printing device 1 will be described with reference to FIG. 1. FIG. 1 is a block diagram illustrating the configuration of the printing device 1.

As shown in FIG. 1, the printing device 1 includes: a printing control unit 10 (a printing control device), an input unit 20, a head 30, a head driving unit 31, and a display unit 40. The printing device 1 is a device which scans media (recording media) by the head 30 and ejects ink from the head 30, thereby performing printing.

The printing control unit 10 is an embodiment of a printing control device according to the present invention. The printing control unit 10 includes: an input receiving unit 11 (scan width information receiver), a head scan control unit 12 (head scan controller), and an assist information generating unit 13.

The input receiving unit 11 is a unit for receiving scan width information. If a user inputs scan width information by use of the input unit 20, the scan width information is transmitted from the input unit 20 to the input receiving unit 11, and the input receiving unit 11 receives the scan width information. Since the printing device 1 is configured as described above such that the user can input desired scan width information, it is possible to adjust the degree of drying of ink and the length of printing time as desired.

The input receiving unit 11 transmits the received scan width information to the head scan control unit 12 and the assist information generating unit 13. In the present embodiment, a form in which the input receiving unit 11 transmits the received scan width information to the head scan control unit 12 and the head scan control unit 12 performs appropriate correction or the like on the scan width information, thereby determining an actual scan width will be described.

However, the printing control device according to the present invention is not limited to that form, and needs only to be configured so as to perform scanning by the head on the basis of scan width information received by the scan width information receiver.

The scan width information is information representing a movement width for scanning, and is information representing a user's desired numerical value. As examples, information representing the length of a movement width of the head 30, information representing the time required for the head 30 to move by a scan width, and the like can be taken. More specifically, for example, the user inputs what distance from either edge of a medium scanning will be further performed by. In this example, for example, if the width of a medium is 1000 mm, and the user inputs 50 mm and 50 mm on the right side and the left side from edges of the medium, respectively, since the head 30 further performs scanning by 50 mm from either edge of the medium, the scan width becomes 1100 mm, and the scan width information becomes information representing the distance of 1100 mm. In other words, the user arbitrarily determines the numerical value of 1100 mm as the scan width, and inputs the numerical value of 50 mm in order to set the numerical value of 1100 mm as the scan width.

Also, as a numerical value which the user inputs, not only information on a distance from either edge of a medium, but also a distance of the entire scan width, information on the time for which the head 30 will further move from either edge of a medium and information on the time required to perform scanning in one direction only, not from edges, can be exemplified. This information is received, as information representing a scan width, by the input receiving unit 11.

In a case where a numerical value input by the user is a distance from either edge of a medium, or the like, not the scan width of the head 30, for example, the input unit 20 may convert the input value into a scan width, and transmit the scan width, as scan width information, to the input receiving unit 11, or the input receiving unit 11 may treat the numerical value input by the user, as scan width information, and the input receiving unit 11 or the head scan control unit 12 may convert the numerical value into an actual scan width of the head 30, and perform control on the head 30.

Also, the input receiving unit 11 receives an instruction for switching between a mode for receiving a desired numerical value from the user and a mode for receiving selection of a preset scan width candidate. In other words, the user can perform switching between a mode for inputting desired scan width information and a mode for selecting a preset candidate, not inputting a numerical value. Therefore, the user can more variously set the scan width.

A plurality of candidates may be set, or one candidate may be set. In a case where the number of candidates is two or more, the user can select any one from the plurality of candidates. For example, in a case where the user wants to finish printing most quickly without a demand for the degree of drying, the user needs only to select the shortest one of the preset scan width candidates, and does not need to input a numerical value. Meanwhile, in a case where the user wants to perform sufficient drying without a demand for the printing speed, the user needs only to select the longest one of the preset scan width candidates.

As examples of the candidates, the followings can be taken. As an example of the candidate for minimizing the scan width, a candidate for performing scanning between both edges of an image area by the head 30 can be taken. Since scanning is performed over only the minimum distance necessary to form a corresponding image, it is possible to minimize the tune of printing. Also, a candidate for performing scanning between both edges of a medium by the head 30, a candidate preset for performing scanning with the head 30 over the maximum drawing width over which the printing device 1 can perform printing, and the like can be taken.

Also, an embodiment of the mode for receiving selection of a preset scan width candidate is a form using a so-called logical seek function. In other words, the printing control unit 10 may have the logical seek function, such that the user can select whether to input an arbitrary scan width or to use the logical seek function.

The user can select whether to perform inputting in the mode for receiving an arbitrary numerical value or to perform inputting in the mode for receiving selection of any one candidate from preset scan width candidates, by selecting any one mode on the input unit 20.

The head scan control unit 12 determines the scan width of the head 30. Also, in a case where the width represented by the scan width information received by the input receiving unit 11 is larger than a predetermined specific width, the head scan control unit 12 determines the specific width as the scan width of the head 30.

The specific width is one of preset scannable widths of the head 30. In the present embodiment, a width for performing scanning over the maximum drawing width over which the printing device 1 can perform printing is set as the specific width, and the specific width is the maximum width settable as the scan width. In this specification, the width which is determined as described above is referred to as the "platen width". Even if the scan width information receiver receives a width larger than the platen width, the head cannot perform scanning over the width larger than the platen width. For this reason, the width for performing scanning by the head is corrected to the platen width, whereby it is possible to appropriately set the scan width of the head.

Therefore, in the present embodiment, in a case where a scan width calculated based on a numerical value input by the user is larger than the platen width, the head scan control unit 12 corrects the scan width of the head 30 from the scan width represented by the scan width information to the platen width.

If determining the scan width of the head 30, the head scan control unit 12 transmits a signal for driving the head 30 over the scan width, to the head driving unit 31. On the basis of the corresponding signal, the head driving unit 31 drives the head 30.

The head scan control unit 12 also determines whether a change of media has been performed after the previous printing. The determining method is not especially limited, and, for example, the determination may be performed by providing a sensor on a platen and receiving the measurement result of the sensor, or may be performed on the basis of the position of a jig for fixing media, or may be performed by requesting the user to input the type of media and acquiring a response, or may be performed by recognizing that an operation of raising and lowering a clamp lever is performed. For example, in the case of recognizing that an operation of raising and lowering the clamp lever is performed, if an operation of raising and lowering the clamp lever is performed, the head scan control unit determines that a change of media has been performed, and returns to a state where the width of media has not been detected, and urges the user to re-detect the width of media. Also, the clamp lever means a lever for raising and lowering a pinch roller for holding media.

In a mode in which the printing control unit 10 requests the user to input a distance from either edge of media, thereby acquiring scan width information, if a change of media to wider ones is performed, a scan width based on the scan width information may exceed the platen width. In the case where the scan width based on the scan width information exceeds the platen width, the head scan control unit 12 corrects the scan width to the platen width.

The assist information generating unit 13 is for generating information for assisting the user in inputting a numerical value. As described above, the printing device according to the present invention may include assist information generator for generating assist information for assisting the user in inputting scan width information.

As examples of the assist information, the followings can be taken. There is information representing references of the degree of drying of ink and the time of printing and a scan width for implementing those references on the basis of the type of ink, print image information, the type of media, and the like input in advance by the user or the like. The assist information generating unit generates information on a scan width for accelerating drying although a long time is required to perform printing, a scan width for shortening the time of printing although the degree of drying lowers, a scan width between those scan widths, and the like, and performs control such that the display unit 40 displays the generated information. Therefore, the user can set a scan width on the assumption of a desired degree of drying and a desired printing time.

Also, as another example of the assist information, information representing a result obtained by simulating a degree of drying and a printing time on the basis of a numerical value input by the user can be taken. Information on the simulation result can be displayed on the display unit 40, whereby the user can confirm whether a desired result will be obtained by the input numerical value, before actually performing printing.

The input unit 20 is a member usable for the user to input information such as a numerical value or an instruction. As examples of specific components, various components such as a mouse, a pen tablet, a light pen, a joy stick, a touch panel, a trackball, a pointing stick, and a keyboard can be taken. The input unit 20 transmits information input by the user, to the input receiving unit 11.

The head 30 is for ejecting ink onto media, and is for scanning media. As the ink, a variety of ink can be used. As examples, ink obtained by diluting pigment or dye with a solvent, ultraviolet curable ink, ultraviolet curable ink containing a solvent, and the like can be taken.

The head driving unit 31 is for driving the head 30, and the head driving unit 31 drives the head 30, whereby the head 30 scans media and eject ink.

As specific components of the head driving unit 31, a guide mechanism which defines the scan direction of the head 30, a motor for moving the head, a cable for transmitting a signal for ejecting ink, and the like can be included.

The display unit 40 is for displaying assist information generated by the assist information generating unit 13. For example, the display unit may be configured by a display such as a liquid crystal display (LCD), a plasma display (PDP), a cathode-ray tube (CRT) display, or an organic EL display.

The printing device 1 moves (feeds) a medium in a direction perpendicular to the scan direction whenever the head 30 performs scanning once, and performs control such that the head 30 performs the next scanning. The time from finish of the previous scanning of the head 30 to start of the next scanning (hereinafter, referred to as the "feeding time") becomes the drying time of ink ejected by the previous scanning. As the scan width decreases, the feeding time also decreases, and as the scan width increases, the feeding time also increases. For this reason, it is preferable to perform control such that the feeding time whenever scanning is performed once is constant over the process from printing to drying. Setting of the feeding time may be performed on the basis of a scan width set by the user. The reason why control is performed such that the feeding time is constant is for keeping the speed and rhythm of feeding constant while the whole process from printing to drying is performed, in a case where an area for printing and an area for drying are separate in the printing device.

<Process of Printing Control Unit 10>

Figure 2:
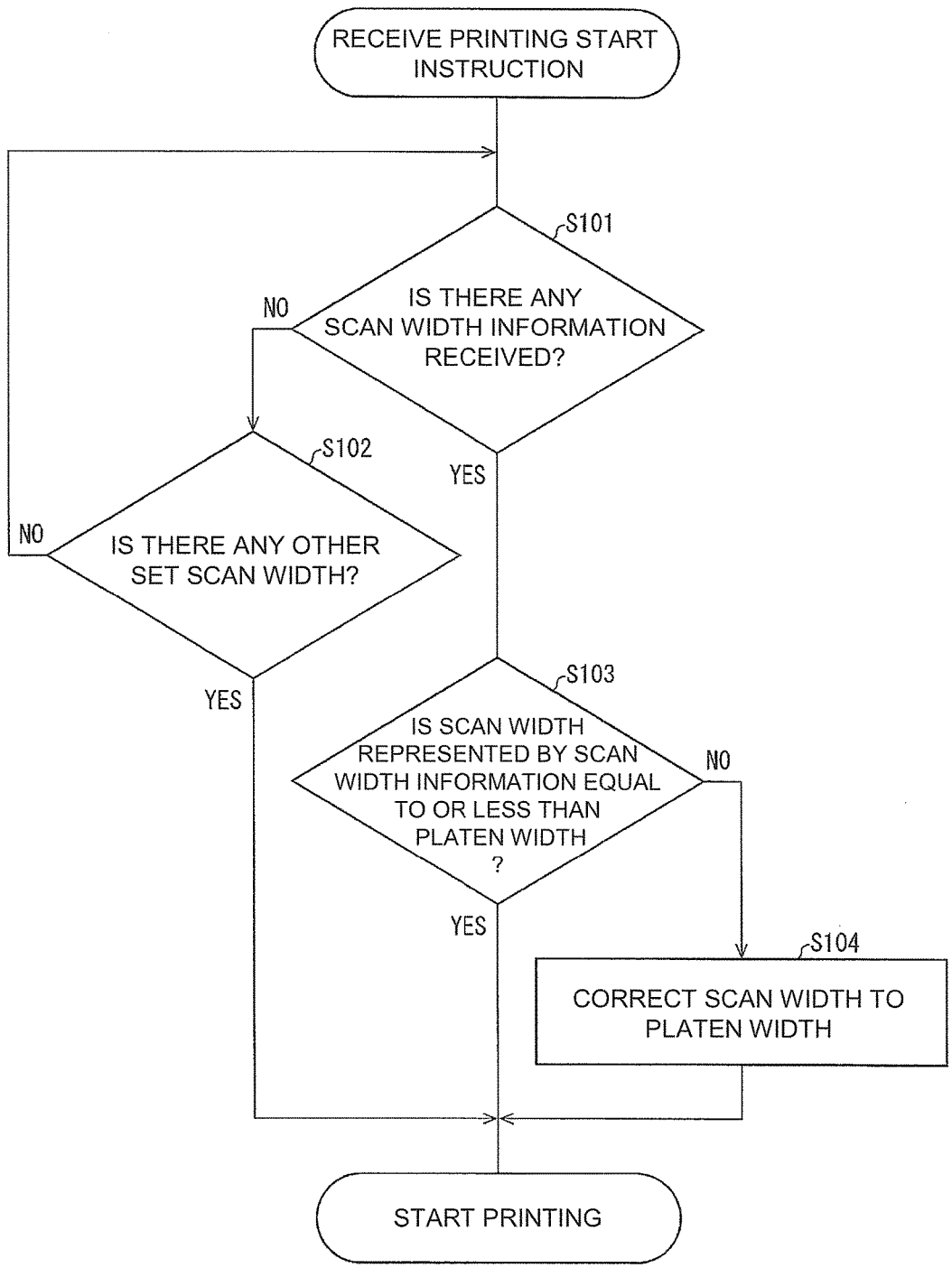
FIG. 2 is a flow chart illustrating a process of a printing control unit 10 which is included in the printing device 1 according to the embodiment of the present invention.

Now, an example of the printing control unit 10 will be described with reference to FIG. 2. FIG. 2 is a flow chart illustrating a process of the printing control unit 10. Here, a form in which the input receiving unit 11 is in the mode for receiving an arbitrary numerical value and the user performs inputting will be described.

If the printing control unit 10 receives a printing start instruction, the head scan control unit 12 determines whether there is any scan width information received (STEP S101). If the input receiving unit 11 has already received scan width information and the scan width information has been transmitted to the head scan control unit 12, the result of STEP S101 becomes "YES". If the head scan control unit 12 has not received any scan width information, the result of STEP S101 becomes "NO".

Also, the case where the result of STEP S101 becomes "YES" means that the user has already input a desired numerical value to be the scan width information, to the input unit 20. The user inputs a desired numerical value, thereby determining a scan width, for example, such that scanning can be further performed by 10 mm from the left of a medium and 10 mm from the right of the medium. If the input receiving unit 11 is in the mode for receiving selection of a preset scan width candidate, the user inputs an instruction for switching the input receiving unit 11 to the mode for receiving a desired numerical value, to the input unit 20.

Also, when the user performs inputting, the assist information generating unit 13 performs a process of displaying assist information on the display unit 40.

In a case where the result of STEP S101 becomes "NO", the head scan control unit 12 determines whether there is any other scan width set to be used in a case where the user does not input a desired value (STEP S102).

As examples of other scan widths, the platen width and the width between both edges of an image area can be taken.

In a case where there is any set width ("YES" in STEP S102), printing starts using the corresponding width as the scan width.

In a case where there is not any other set scan width ("NO" in STEP S102), the process returns to STEP S101.

In the case where the result of STEP S101 is "YES", the head scan control unit 12 determines whether the scan width represented by the scan width information is equal to or less than the platen width (STEP S103). Here, the head scan control unit 12 also determines whether a change of media has been performed after the previous printing, and calculates a scan width from the scan width information on the basis of current media, and determines whether the calculated scan width is equal to or less than the platen width.

In a case where the result of STEP S103 is "YES", printing starts. In a case where the result of STEP S103 is "NO", the scan width is corrected to the platen width (STEP S104), and printing starts.

According to the process described above, printing can be performed by performing scanning with the head 30 over a user's desired scan width or the platen width.

<Implementation Example Based on Software>

Control blocks (the input receiving unit 11, the head scan control unit 12, and the assist information generating unit 13) of the printing control unit 10 may be implemented by a logic circuit (hardware) formed in an integrated circuit (an IC chip), or may be implemented by execution of software in a CPU (central processing unit).

In the latter case, the printing control unit 10 includes a CPU that executes commands of a program which is software for implementing individual functions, a read only memory (ROM) or a storage device (each referred to as a "recording medium") that retains the program and a variety of data readable by a computer (or the CPU), a random access memory (RAM) that develops the program, and so on. In this case, the computer (or the CPU) reads the program from the recording medium and executes the program, whereby the object of the present invention can be achieved. As the recording medium, a "non-transitory tangible medium", such as a tape, a disk, a card, a semiconductor memory, or a programmable logic circuit, can be used. Also, the program may be supplied to the computer via an arbitrary transmission medium (such as a communication network or a broadcast wave) capable of transmitting the program. Also, the present invention can be implemented in the form of a data signal embedded in a carrier wave as an embodiment of the program based on electronic transmission.

The present invention is not limited to the above described embodiment, and can be variously modified within the scope defined by claims, and embodiments which can be obtained by appropriately combining the individual technical means disclosed in the embodiment are also included in the technical scope of the present invention.

<Supplementary Information>

As described above, the printing control unit 10 is a printing control unit 10 which controls the printing device 1 having the head 30 for scanning media and ejecting ink onto the media and includes the input receiving unit 11 for receiving scan width information representing a movement width for scanning, and the scan width information is information representing a user's desired numerical value.

The user can perform scanning with the head 30 over a desired width. Therefore, it is possible to adjust the degree of drying of ink and the time of printing as desired.

In the printing control unit 10, scan width information is information representing the length of a width which the head 30 will move, or information representing the time required for the head 30 to move by the above described width. Since the user can easily assume an actual scan width, inputting becomes easy.

The printing control unit 10 includes the head scan control unit 12 for determining a scan width over which the head 30 will perform scanning, and in a case where a width represented by scan width information received by the input receiving unit 11 is larger than the predetermined platen width, the head scan control unit 12 determines the scan width of the head 30 to the corresponding platen width.

In the printing control unit 10, the input receiving unit 11 receives an instruction for switching between the mode for receiving a desired numerical value from the user and the mode for receiving selection of a preset scan width candidate.

The user can more variously set the scan width. For example, in a case where the user wants to finish printing most quickly without a demand for the degree of drying, the user needs only to select the shortest one of preset scan width candidates, and does not need to input a numerical value. Meanwhile, in a case where the user wants to perform sufficient drying without a demand for the printing speed, the user needs only to select the longest one of the preset scan width candidates.

Even if the input receiving unit 11 receives a width larger than the platen width, the head cannot perform scanning over the corresponding width. For this reason, the width over which the head will perform scanning is corrected to the platen width, whereby it is possible to appropriately set the scan width of the head.

INDUSTRIAL APPLICABILITY

The present invention can be used in printing using an inkjet recording device.

The invention claimed is:

1. A printing control device which controls a printing device having a head for scanning a recording medium and ejecting an ink onto the recording medium, comprising:
   a scan width information receiver that receives a scan width information representing a width over which the head will move during scanning,
   wherein the scan width information is information on a distance comprising a width of the recording medium and a distance from either edge of the recording medium, or information on a time comprising a time for the head to move across the width of the recording medium and a time which the head will further move from either edge of the recording medium, and the scan width information is information representing any numerical value corresponding to a user's desired degree of drying of ink.

2. The printing control device according to claim 1, wherein
   the scan width information is information representing a length of the width over which the head will move, or information representing a time required for the head to move by the width.

3. The printing control device according to claim 2, wherein
   the scan width information receiver receives an instruction for switching between a mode for receiving a desired numerical value from a user and a mode for receiving selection of a preset scan width candidate.

4. The printing control device according to claim 1, further comprising:
   a head scan controller that determines a width over which the head will perform scanning,
   wherein, in a case where the width represented by the scan width information received by the scan width information receiver is larger than a predetermined specific width, the head scan controller determines the specific width as the width over which the head will perform scanning.

5. The printing control device according to claim 4, wherein
   the scan width information receiver receives an instruction for switching between a mode for receiving a desired numerical value from a user and a mode for receiving selection of a preset scan width candidate.

6. The printing control device according to claim 1, wherein
   the scan width information receiver receives an instruction for switching between a mode for receiving a desired numerical value from a user and a mode for receiving selection of a preset scan width candidate.

7. A printing device, comprising:
   a head that scans a recording medium and ejects ink onto the recording medium;
   a printing control device that controls scanning of the head, and
   wherein the printing control device includes: a scan width information receiver that receives a scan width information representing a width over which the head will move during scanning,
   the scan width information is information on a distance comprising a width of the recording medium and a distance from either edge of the recording medium, or information on a time comprising a time for the head to move across the width of the recording medium and a time which the head will further move from either edge of the recording medium, and the scan width information is information representing any numerical value corresponding to a user's desired degree of drying of ink.

8. A non-transitory computer-readable recording medium retaining a program for making a computer function as:
   a head scan controller which performs control such that a head scans a recording medium and ejects ink onto the recording medium; and
   a scan width information receiver which receives information as a scan width information representing a width over which the head will move during scanning, wherein the scan width information is information on a distance comprising a width of the recording medium and a distance from either edge of the recording medium, or information on a time comprising a time for the head to move across the width of the recording medium and a time which the head will further move from either edge of the recording medium, and the scan width information is information representing any numerical value corresponding to a user's desired degree of drying of ink.

* * * * *